US007995076B2

(12) United States Patent
Emam et al.

(10) Patent No.: US 7,995,076 B2
(45) Date of Patent: Aug. 9, 2011

(54) SYSTEM AND METHOD FOR GENERATING VIRTUAL IMAGES ACCORDING TO POSITION OF VIEWERS

(75) Inventors: Ossama Emam, Giza (EG); Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 11/877,165

(22) Filed: Oct. 23, 2007

(65) Prior Publication Data

US 2008/0111832 A1    May 15, 2008

(30) Foreign Application Priority Data

Oct. 23, 2006   (EP) ..................................... 06122775

(51) Int. Cl.
*G09G 5/00* (2006.01)
(52) U.S. Cl. ........ 345/633; 345/629; 345/630; 345/631; 345/632; 345/634
(58) Field of Classification Search ......................... None
See application file for complete search history.

(56) References Cited

U.S. PATENT DOCUMENTS

| | | | |
|---|---|---|---|
| 4,875,034 A | 10/1989 | Brokenshire | |
| 6,236,968 B1 | 5/2001 | Kanevsky | |
| 6,597,410 B1 | 7/2003 | Doany | |
| 6,792,339 B2 | 9/2004 | Basson | |
| 7,610,558 B2 * | 10/2009 | Morita | 715/757 |
| 7,617,246 B2 * | 11/2009 | Koch et al. | 1/1 |
| 2003/0035412 A1 * | 2/2003 | Wang et al. | 370/352 |
| 2004/0109012 A1 * | 6/2004 | Kraus et al. | 345/700 |
| 2005/0278753 A1 * | 12/2005 | Brady et al. | 725/76 |
| 2006/0066477 A1 * | 3/2006 | Hollis et al. | 342/357.07 |

OTHER PUBLICATIONS

Sphorer, J.C., "Information in Places", IBM Systems Journal, vol. 38—No. 4 (1999).
"industry First:Sharp Triple Viewing LCD Offers Simultaneous Display of 3 Images", Sharp Web Site, (Sep. 27, 2006).

* cited by examiner

*Primary Examiner* — Kee M Tung
*Assistant Examiner* — Jwalant Amin
(74) *Attorney, Agent, or Firm* — William Stock; Anne Vachon Dougherty

(57) ABSTRACT

A method generates and superposes virtual images to an existing image in order to show special effects. Images are generated depending on the relative position of one or more subjects viewing the existing image. The images are generated in order to see an augmented reality. The subjects are people located near a transparent support such as a screen or a window. These people watch the augmented reality through the screen/window. The virtual objects on the screen are created in such a way as to give a realistic impression for different people watching the same screen/window at the same time, thereby generating virtual images in order to create an augmented reality for one or many viewers watching the same real objects at the same time.

13 Claims, 7 Drawing Sheets

SYSTEM AND METHOD FOR GENERATING VIRTUAL IMAGES ACCORDING TO POSITION OF VIEWERS

FIELD OF THE INVENTION

The present invention relates generally to the generation of virtual images based on specific situations and, more specifically, to a system, method and computer program for generating and displaying virtual objects (images) on a screen (or a window) in order to create specific effects depending on the position of one or more subjects located near this screen or window.

BACKGROUND OF THE INVENTION

Augmented Reality

Augmented reality (AR) deals with the combination of real world and computer generated data. Augmented Reality (abbreviated AR) was introduced as the opposite of Virtual Reality (VR): instead of diving the user into a synthesized, purely informational environment, the goal of Augmented Reality (AR) is to augment the real world with information handling capabilities. Others define VR as a special case of Augmented Reality (AR), in the sense that AR adds to what VR already does. Additionally, augmented reality is itself a special case of the more general concept of Mediated Reality (med-R), in the sense that mediated reality allows for the perception of reality to be augmented, deliberately diminished, or otherwise modified.

Augmented reality is an environment that includes both Virtual Reality and real-world elements. For instance, an AR user might wear translucent goggles; through these, he could see the real world, as well as computer-generated images projected on top of that world. Azuma defines an augmented reality system as one that
  combines real and virtual
  is interactive in real time
  is registered in 3D One example of Augmented Reality (AR) is the yellow first-down line seen in television broadcasts of American football games. The real-world elements are the football field and players, and the virtual element is the yellow line, which is drawn over the image by computers in real time. (Note that this example is not an augmented reality according to the definition above, because there is no interactive element). Some other examples of AR applications include:
  Interactive three-dimensional maps that could be collaboratively modified and analyzed (e.g., for prospecting);
  Television broadcasts in which captions point out which cars in an auto race are where;
  Visualization of hidden features (e.g., a doctor could "see" the foetus inside the mother's womb);
  Assisting difficult tasks (e.g., the system could "label" the parts of a system in order to facilitate the mechanic's work);
  Enhanced sightseeing: labels or any text related to the objects/places seen, rebuilt ruins, building or even landscape as seen in the past. Combined with a wireless network the amount of data displayed is limitless (encyclopaedic articles, news, etc. . . . ).
  Teleconferencing with both real and virtual participants
  Entertainment (allowing computer-generated imagery to interact with live entertainers)
  Games.

The publication entitled "Information in places" by J. C. Spohrer, IBM Systems Journal Volume 38, Number 4, 1999 Pervasive Computing, relates to augmented reality. Unlike virtual reality systems that allow users to experience a completely virtual or simulated world, augmented reality systems allow users to experience a mixed reality that combines virtual objects with real-world objects. Video special effects, as seen in commercials, television programs, and movies, offer a glimpse at some of the possibilities when artificial images can be seamlessly combined with real images—for example, cars that seem to dissolve before one's eyes offering cut-away views, or animated characters in the kitchen encouraging kids to eat their breakfast. Unlike video special effects, augmented reality systems support the perception of real special effects—or special effects happening right where a person is in real time and in real space. For example, imagine a person walking into a parking lot and looking at a car while wearing special eyeglasses, or looking through the viewfinder of a special video camera, who is then able to see a cut-away view of the car exposing the complete exhaust system perfectly aligned with the real car. That person is perceiving a real special effect or experiencing augmented reality.

PROBLEM

The problem is to generate images on a screen (or a window) depending on the position of persons located near this screen. The images must be generated in order to see an augmented reality and must give a realistic impression for different persons watching the same screen at the same time.

A problem resides in the fact that the augmented reality (especially in 3 dimensions) is different depending on the angle of view. Therefore some clever tricks are necessary to generate virtual images for people watching from different angles.

Another problem resides in the fact that people are moving (when for instance, people are in a car or in a bus). The angles of view are changing and it is necessary to modify the virtual objects on the screen accordingly to preserve the realistic effect.

PRIOR ART

A technique for introducing different views for different angels is described for instance in an article on the sharp world web site entitled "Industry First*: Sharp Triple Directional Viewing LCD Offers Simultaneous Display of 3 Images", Sep. 27, 2006. Sharp Corporation and Sharp Laboratories of Europe, Ltd. (SLE) have developed a Triple Directional Viewing LCD, a display that controls the viewing angle so that the display can show different images from the left, right, and center simultaneously. This LCD technology has opened up new digital consumer electronics markets for products like TVs, notebook PCs, and mobile phones. The same company developed two products for controlled viewing angle: a two-way viewing-angle LCD and a switchable viewing-angle LCD. These displays are used in products like car navigation systems and mobile phones. Sharp Triple Directional Viewing LCD takes this controlled viewing-angle technology a step further. Using a proprietary parallax barrier on a standard TFT LCD, the screen splits light in three directions (left, right, and center) and displays three separate images on the same screen at the same time. Imagine, for example, people taking a drive in a van. The driver uses a car navigation system screen, the person in the passenger seat checks out tourist sites and restaurants, and the person in the back seat enjoys a movie on DVD, all in full-screen view. It's truly one LCD that plays three roles at once. Sharp Triple Directional Viewing LCD can also be used for multipurpose signs in public: it could display three different ads for stores or restaurants, each aimed at people walking in a certain direction.

U.S. Pat. No. 4,875,034 Daniel Brokenshire, entitled "Stereoscopic graphics display system with multiple windows for displaying multiple images" discloses a stereoscopic graphics display system having a stereoscopic window controller that generates multiple windows within which multiple images are formed. The stereoscopic window controller directs the graphics display system to render around each window a border representing an outline of the window. Each of the borders is rendered with zero binocular disparity to assist an observer to perceive the three-dimensional qualities of stereoscopic images. Depth cue contradictions between stacked windows are reduced by rendering with zero binocular disparity the images in occluded windows.

US patent application US2005/0278753 Brady et al., entitled "Broadcast passenger flight information system and method for using the same" discloses a system and method for integrating a landscape image taken by a camera positioned in a vehicle, such as an aircraft, with images that are generated by an in-flight entertainment system (IFES) so that the IFES is capable of generating landscape images for the passengers while the aircraft is in flight. The IFES receives input data pertaining to characteristics of the aircraft and controls the display units that can be viewed by the passengers to generate a display image including information based on the input data and landscape video data provided by a camera positioned to obtain images from outside the aircraft, so that the passenger can view the landscape image along with information pertaining to the location of the aircraft, points of interest on the landscape image, and so on while the aircraft is in flight. The landscape image can be a real-time image or a frame image taken at periodic intervals. The information can also include a link to a web site that enables the passenger to click on the link to cause the display unit to display information pertaining to a point of interest in a browser-type display window.

However, in the prior art there is nothing about coordination of real and virtual objects so that images can be seen realistically:
 simultaneously by one or more persons (each person having a different angle of view); and
 by persons who are moving (where angles of view are changing).

Also the prior art does not discloses how to make virtual objects look realistic in the augmented reality through a window. The prior art rather focuses on
 the generation of virtual images in head mount displays;
 the reflection (through a mirror) of virtual and real images on a screen (not window);
 the insertion of pins in the window for creating images in this window (by activating these pins).

SUMMARY OF THE INVENTION

The present invention is directed to a method, a system and computer program as defined in independent claims.

In particular the present invention discloses a method for generating virtual images in order to create an augmented reality for one or a plurality of viewers watching a real background at the same time. The method comprises the steps of:
 capturing images of a real background comprising one or a plurality of real objects;
 recognizing one or more of said real objects in said captured images;
 identifying possible virtual objects related to recognized real objects and not present in said captured images;
 automatically interpreting the captured images;
 generating virtual images of virtual objects among identified possible virtual objects based on interpreted captured images;
 positioning each virtual object relatively to the real objects;
 adapting the virtual images depending on the position of said virtual objects;
 determining a plurality of angles of view to watch the background;
 adapting said virtual images for each angle of view, in order to superimpose said virtual images on the real background;
 displaying said virtual images so that said virtual objects are seen differently depending on the angle of view relatively to the real background.

Further embodiments of the invention are provided in the appended dependent claims.

This invention has many advantages as will be explained further below.

The foregoing, together with other objects, features, and advantages of this invention can be better appreciated with reference to the following specification, claims and drawings.

BRIEF DESCRIPTION OF THE DRAWINGS

The new and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

Figure 1:
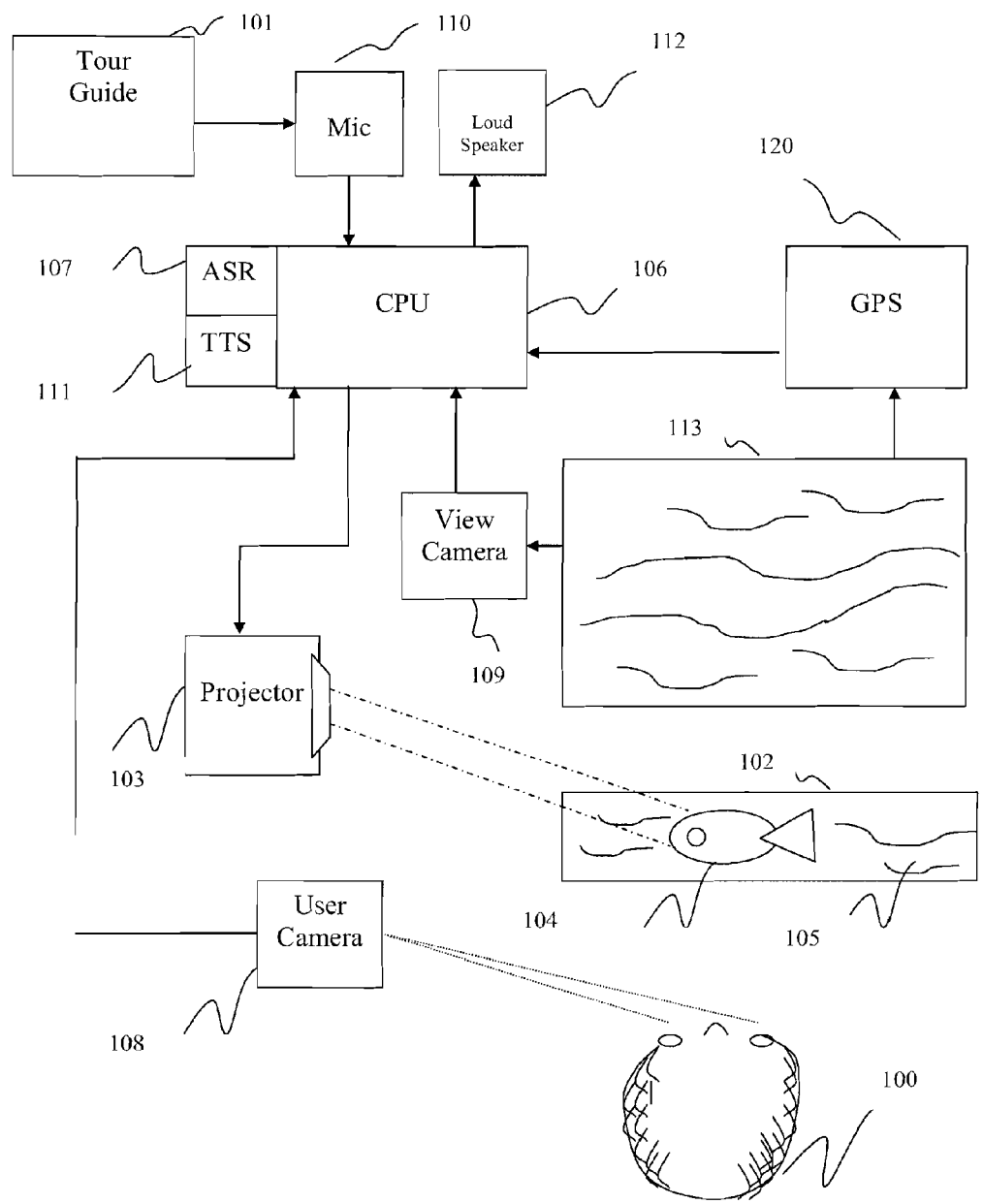
FIG. 1 is a general logical view of the system according to the invention.

The present invention discloses a method for generating and superposing virtual images to an existing image in order to show special effects, said images being generated depending on relative position of one or more subjects watching said existing image.

The images are generated in order to see an augmented reality. The subjects are people located near a transparent support such as a screen or a window. These people watch the augmented reality through the screen/window. The virtual objects on the screen are created in such a way to give a realistic impression for different people watching the same screen/window at the same time.

A first problem resides in the fact that the augmented reality (especially in 3 dimensions) is different depending on the angle of view. Therefore some specific arrangements are necessary to generate virtual images for people watching from different angles.

A second problem resides in the fact that people are moving (when for instance, people are in a car or in a bus). The angles of view are changing and it is necessary to modify the virtual objects on the screen accordingly to preserve the realistic effect.

The object of the present invention is to create a visual image projected on a substantially transparent support, like a window or a screen (for instance on the window of a bus). The image is a superimposed image that fits the landscape and depicts historical or imaginary events. The superimposed images can be created by various means:
- a special projector; or
- a special display; or
- a kind of head mount display; or
  - a transparent glass that is able to show images.

The present invention can be implemented in such a way that different people located in different places and watching through one window could see coherent integrated images whatever the angle of view. This can be done by detecting by means of cameras the eyes of the people watching the window and by creating virtual images that can be seen differently depending on the angle of view.

The present invention is able to generate virtual images and to show these virtual images on any window (without inserting any hardware in the window)—like holography. None of the prior art suggests to exploit holographic technique to create an augmented reality in the context of the present invention (to allow a view from different angles).

Other technologies allow to "print" virtual images in a window to create the impression that these images are in fact located far away beyond the window.

The present invention has various applications in particular in the tourism industry. When tours actually take place there is often no visual or images to help a tour guide in explanation. For example, when passing an ocean shore that is famous for having dolphins and no dolphins are present it may be difficult and even boring for tourists to watch. Another example is when a tourist group visits some historic sight of a war. The tourists see nothing but ruins and rocks. They may be disinterested if they don't have anything to aid their imagination. It would be interesting for a tourist to see how the ancient Egyptians built the Pyramids while looking at the real Pyramids in today's life time. In general, tours would be much more pleasing to tourists if there could be some sort of visual representation instead of the present state of the site. There have been a few supplements that may aid the tour guide and tourists in a tour such as a pamphlets and videos throughout a tour but none of this could compare to actually be able to see the real actions of what had taken place.

Thanks to the present invention, when a bus passes along an ocean shore where there should be dolphins but there are none, a movie or images can be projected or displayed on the windows of the bus so that passengers can imagine there really are dolphins swimming in the water. Similarly, when a group visits a site of an old war, a battle scene can be projected on the windows to give a better image to the tourists.

Another area of application of the present application is military training. Soldiers who sit for example, in a tank, can use virtual images of enemy targets overlapped with real images of a battlefield. Similarly, pilots of airplanes can use virtual images of enemy airplanes or images of objects on the ground.

Similarly the invention can be used in education processes in other areas—like medical. Students can view virtual images of objects on a body on real substances (e.g. virtual viruses in a real blood—via microscope, or virtual cancer image imposed on a real body image etc.).

Another area of application is advertisement—combination of virtual images that are imposed on real things to advertise something.

This list of applications is not limitative.

LOGICAL VIEW OF THE INVENTION

FIG. 1 is a logical view of the invention as it can be used by a tour operator. A passenger 100 sits in a tourist bus and looks out the window 102. On the window 102 there is an image of a dolphin 104 made by the projector 103. The passenger sees the dolphin projection 104 and, at the same time, he/she also sees the ocean in the background 105. The tour guide 101 speaks into the microphone 110. The microphone data is sent to the computer 106. In the computer 106, there is a computer (CPU) which executes different programs. In particular, programs such as ASR (Automatic Speech Recognition) 107 can understand what the tour guide says and then pilots the projector 103.

Another method of coordinating the projection and background view 113 together is to use a Global Positioning System (GPS) 120. The GPS 120 is connected to the computer 106. Thanks to the information provided by the GPS 120 system, the computer 106 knows when to cue the projector 103.

A camera 108 is used to detect the directions of the eyes of the passenger 100. This information is used by the computer 106 to continuously update the virtual images so that they can be correctly seen by the passenger depending on his/her angle of view.

Another camera 109 is used to capture an image of the surroundings 113 and to send this image to the computer 106 for analysis. This resulting image will be later used in the construction of the image that will be sent to the projector 103. Optionally, the system can use the image of the surroundings captured by the camera 109 and the input of the GPS 120 to generate a narration text related to a tourist attraction at the surroundings 113. The system can send this narration text to a Text-To-Speech (TTS) synthesizer 111 to produce a speech corresponding to the text that will be heard by the passengers through a loud speaker 112.

Superimposed Head Mount Display

Figure 2:
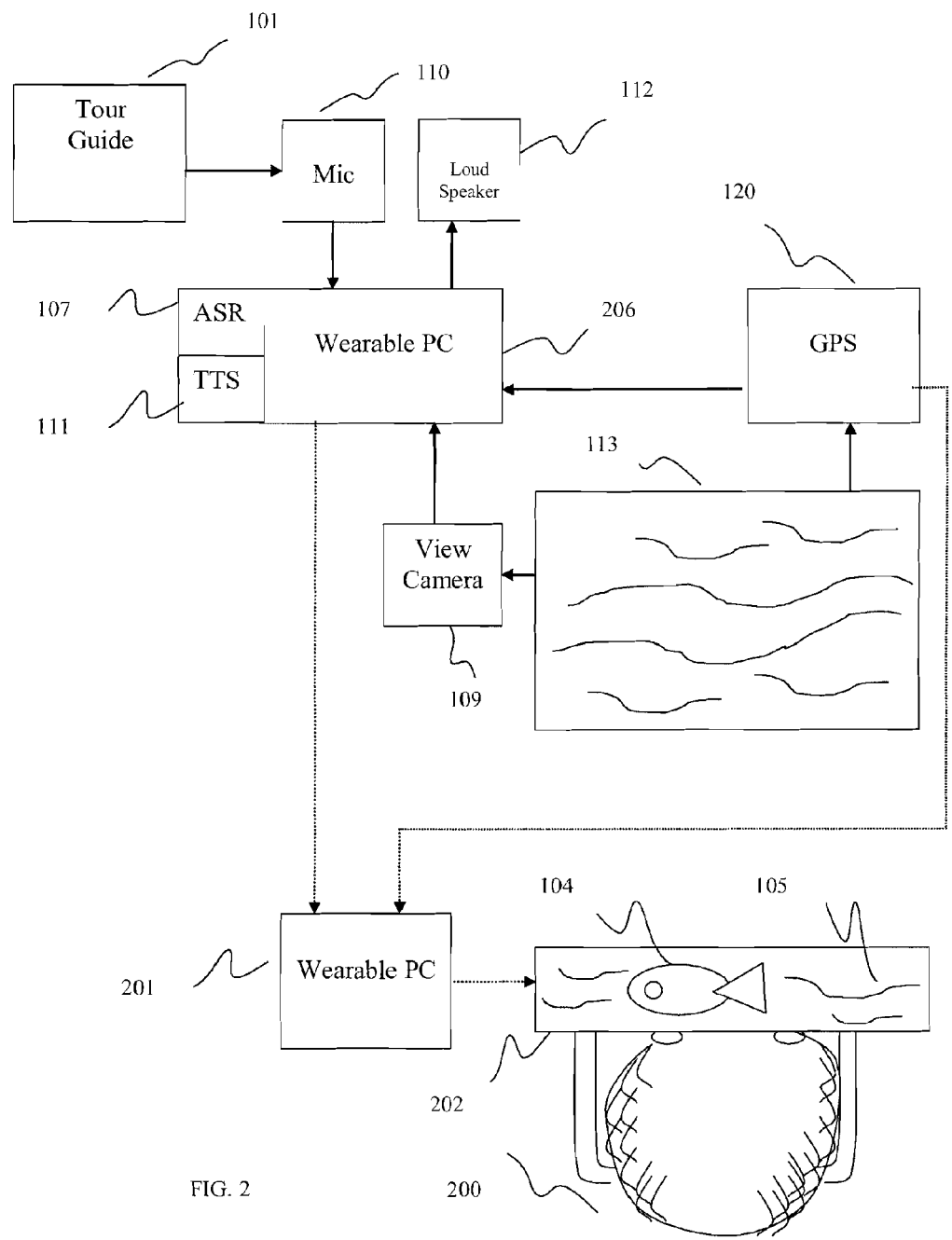
FIG. 2 is a logical view a superimposed head mount display according to the invention.

FIG. 2 is a logical view of a superimposed head mount display. The user 200 is wearing a head mount display 202 and is walking along the beach, 102. On the head mount display, a dolphin 104 is displayed. The user has the impression that the dolphin is really in the water. The head mount display 202 is wirelessly connected to a wearable computer 201. The computer 201 knows in which direction the person is looking at thanks to a GPS system 202 connected to a GPS satellite 120 and can coordinate the displayed virtual images and the background 113.

In a particular embodiment, the tour guide 101 has a microphone 110 and a wearable Personal Computer (PC) 206. The wearable Personal Computer (PC) 206 cues displays on the tourists head mounts with certain words. For example, the words "dolphins swim here" trigger the appearance of a dolphin on the head mount displays of the tourists.

MODE OF EXECUTION OF THE INVENTION

Figure 3:
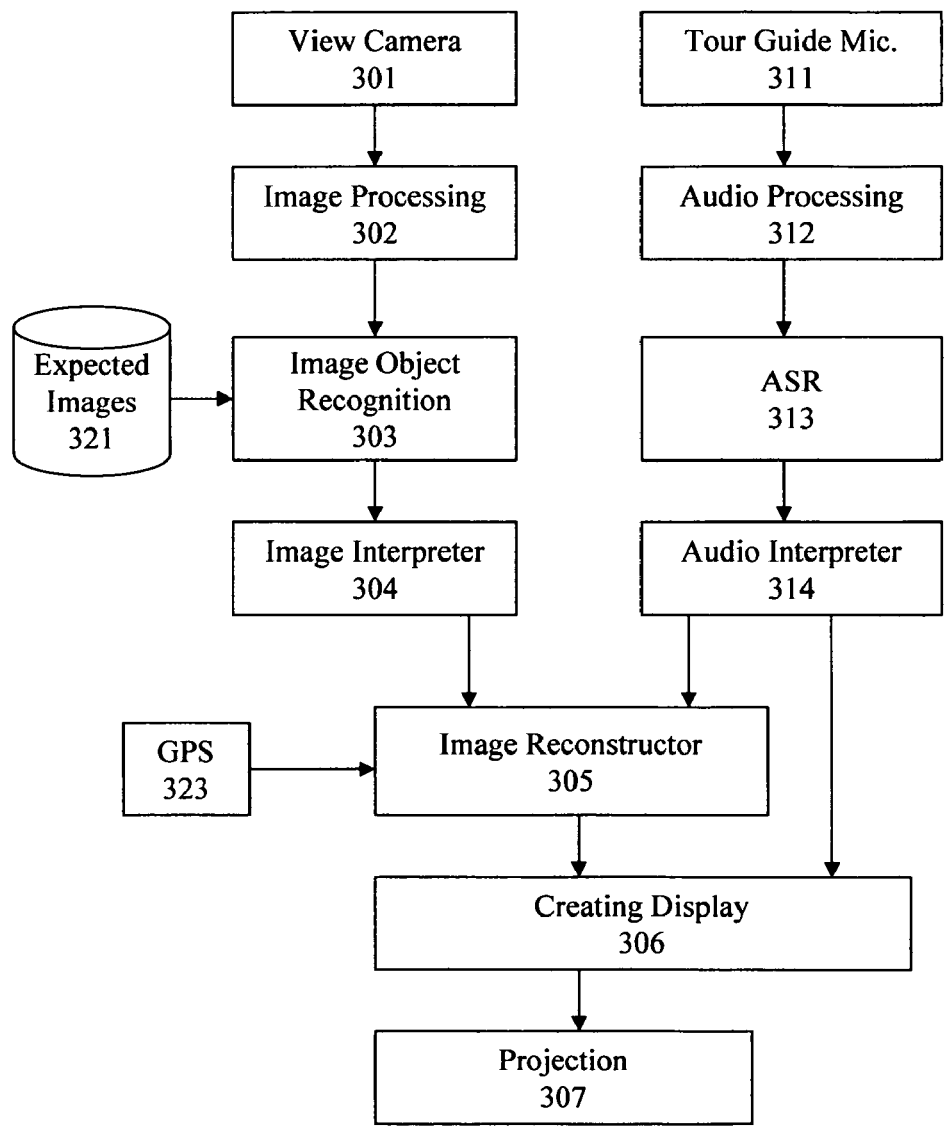
FIG. 3 shows the mode of execution of the invention.

FIG. 3 shows how the invention is running in computer 106 and shows the different components involved in the process.

A camera 301 monitors the surrounding environment and sends images to an image processor module 302.

The image processor module 302 processes images digitally.

An image object recognition module 303 recognizes one or more objects in the digital images and searches for expected images related to these objects in the database 321, said database comprising a collection of images. For example, if a group of tourists goes to the ocean, we can suppose that this group will see marine animals, ships, etc. The role of the image object recognition module in this case is the following:

to recognize that there is a sea or ocean and some objects that are currently present in the sea like birds and ships etc; and to search in the database for images related to the ocean that are not currently present in reality on the sea, like dolphins.

An image interpreter module 304 interprets the situation and gives an exact interpretation for the situation.

Interpretation of images and situation is done using techniques as described for example in U.S. Pat. No. 6,792,339 Basson et al., entitled "Artificial passenger with condition sensors". U.S. Pat. No. 6,792,339 discloses a situation controller for a vehicle. The situation controller includes a processing device and an image monitor coupled to the processing device, for monitoring images associated with one or more items within the vehicle. The situation controller also includes a device for communicating a message relating to the one or more monitored items wherein the content of the message is determined by the processing device based at least in part on the one or more monitored items. Additionally, a controller coupled to the processing device, for controlling at least one function of the vehicle in response to the one or more monitored items within the vehicle, is included.

The semantic interpretation of a situation implies to find what the situation means. The interpretation results in recognizing for example, that a dolphin swims near a ship, or that a thunderstorm is coming and boats are sailing to a port quickly. The interpreter can define the scenarios which in a situation are missing and can complement these missing parts via virtual images (for example, if there is a ship the system can add a virtual dolphin that swims toward this ship).

An audio processor module 312 handles audio data received from the tour guide microphone 311.

The audio data is transcribed into text using an Automatic Speech Recognition system (ASR) 313.

The resulted text is passed through an audio interpreter module 314. The audio interpreter module is a semantic interpreter of textual data (i.e. a decoded text). The semantic interpretation of a decoded text takes into account possible decoding errors and is able to recover the semantic meaning of a decoded phrase even if there are errors. There are many methods described in the literature that allow to interpret the semantic meaning of decoded texts.

U.S. Pat. No. 6,236,968 Kanevsky et al., entitled "Sleep prevention dialog based car system" discloses an automatic dialog system capable of keeping a driver awake while driving during a long trip or one that extends into the late evening. The system carries on a conversation with the driver on various topics utilizing a natural dialog car system. The system includes an automatic speech recognition module, a speech generation module which includes speech synthesis or recorded speech, and possibly dynamically combined speech synthesizer and recorded speech, and a natural language processing module. The natural dialog car system analyzes a driver's answer and the contents of the answer together with his voice patterns to determine if he is alert while driving. The system warns the driver or changes the topic of conversation if the system determines that the driver is about to fall asleep. The system may also detect whether a driver is effected by alcohol or drugs.

An image reconstructor module 305 uses the data in output of the audio and image interpreters to create an image. It uses the data of a GPS sensor 323. The image reconstructor module integrates a virtual image in the way that the virtual object on this virtual image appears to viewers as located near some real objects. This virtual image taken from the image database is transformed into an image that corresponds to the location of the virtual object. For example, the size of a virtual image is reduced if this virtual image represents an object that is located far away from a viewer. Algorithms transforming images depending on the location of the objects are similar to the algorithms described in U.S. Pat. No. 6,597,410, Doany et al., entitled "System for the automatic adaptation of projector images and a method for the implementation thereof".

This U.S. Pat. No. 6,597,410 discloses a computerized projector system which automatically adapts projected images emanating from projectors to fit the size and conditions of screens on which the images are displayed. Moreover, disclosed is a novel method of utilizing a computerized projector system which automatically adapts projected images to a shape and condition in correlation with the size and configuration of the screens onto which the images are projected.

A GPS sensor data 323 gives exact locations of virtual objects that will be shown on the display.

A video and audio database is used to create a display 306. Audio and video data are synchronized. When a virtual image (e.g. a tiger) is shown, a sound related to this virtual image is played (e.g. the roar of the tiger is played).

A projector 307 projects the superimposed images.

Main Components

Image Interpreter

Figure 4:
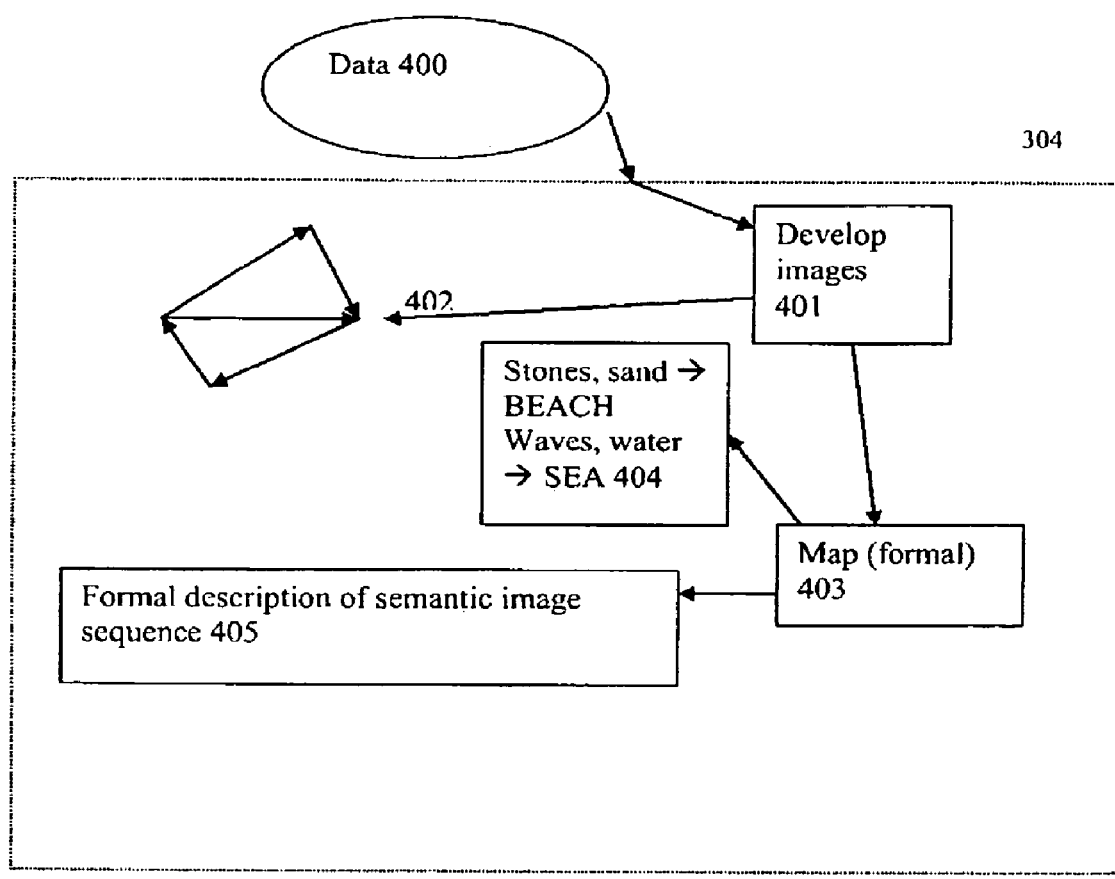
FIG. 4 describes the image interpreter according to the present invention.

FIG. 4 explains the function of the image interpreter module, 304. Data 400 is entered into a image semantic describer 401. The image semantic describer 401 interprets images by associating components of images with some general categories using a graph of images 402. For example, objects like STONES, SAND, . . . can be associated with a category like BEACH. A graph of images reflects how images are connected to each other. For example, a DOLPHIN is connected to a SEA (since a DOLPHIN is seen in a SEA). A SUN is connected to a SEA since the SUN raises above the SEA early in morning. A SUN is also connected to a SKY since the SUN is in the SKY, etc. . . .

A formal map of the location of observed objects is shown in 403. Objects are described in some formal language that represents many variations in a normalized way. This is a standard process that is used in translation and parsing and which is well known by the persons skilled in the field of the invention. In the present example, a semantic situation where something is seen through any window (car side window or front window) can be represented formally as THROUGH-WINDOW.

The formal description of semantic image sequences in 405 uses information from the database of local maps and data from the database of X objects. The data base of X objects lists certain objects that may be found at certain locations (e.g. DOLPHINS in a SEA near a BEACH).

An example of how objects are grouped into classes is given in 404. Each object fits into a class. There is a set of related properties that links objects of a same class (e.g. images of waves, water are mapped into a class SEA, sand, stones on a beach are mapped into a class BEACH etc.).

"X Objects—class ON—class SEA—THROUGH—WINDOW" is an example of formal string of words. This string of formal words has in a formal way the meaning of a particular possible phrase:

X objects—e.g. a dolphin
Class ON—means an object on something (here—an object in a sea)
Class SEA—it can be a sea, or ocean etc.
THROUGH—through
WINDOW—a window The interpretation depends on how sequences of particular words are represented in a formal way (as a formal string of some categories). In the present example, the formal string of words could be interpreted as follows "A dolphin is in a sea through a window".

"class SEA-LOCATED-NEAR-BEACH" is another similar example of string of words.

class SEA=sea, or ocean, or lake
LOCATED=swim, located, etc.
NEAR=near
BEACH=beach, port, etc.

This formal string of word could be interpreted as follows "A dolphin swims in an ocean near a port".

This information is then put together and used by the image reconstructor, 305.

Audio Semantic Interpreter

Figure 5:
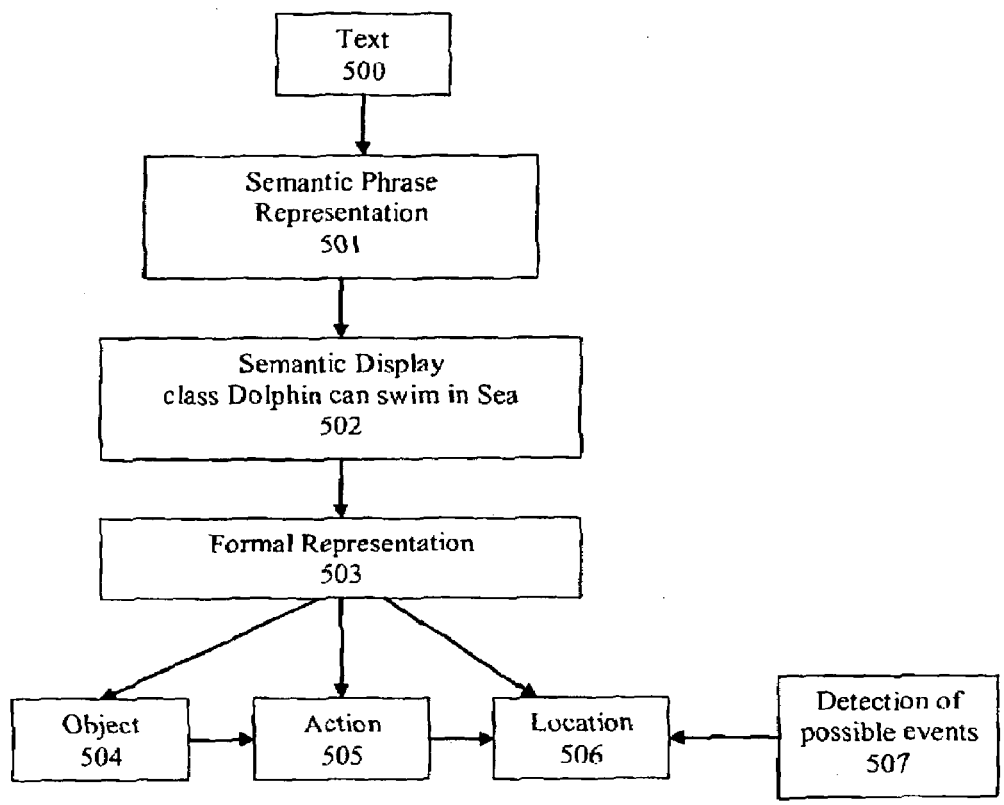
FIG. 5 explains the semantic interpreter according to the present invention.

FIG. 5 explains the function of audio interpreter module 314. The text data 500 generated by the ASR is passed to the semantic phrase representation module 501. An example of semantic display 502 is: "class DOLPHIN—CAN—SWIM IN SEA". A formal object representation 503 puts the interpretation into a more understandable form. The object 504 (an animal or a fish for instance) has the possibility of doing an action 505 (to swim for instance) in a location 506 (in the sea for instance). The detection of possible events 507 determines which object must be displayed.

Image Reconstructor

Figure 6:
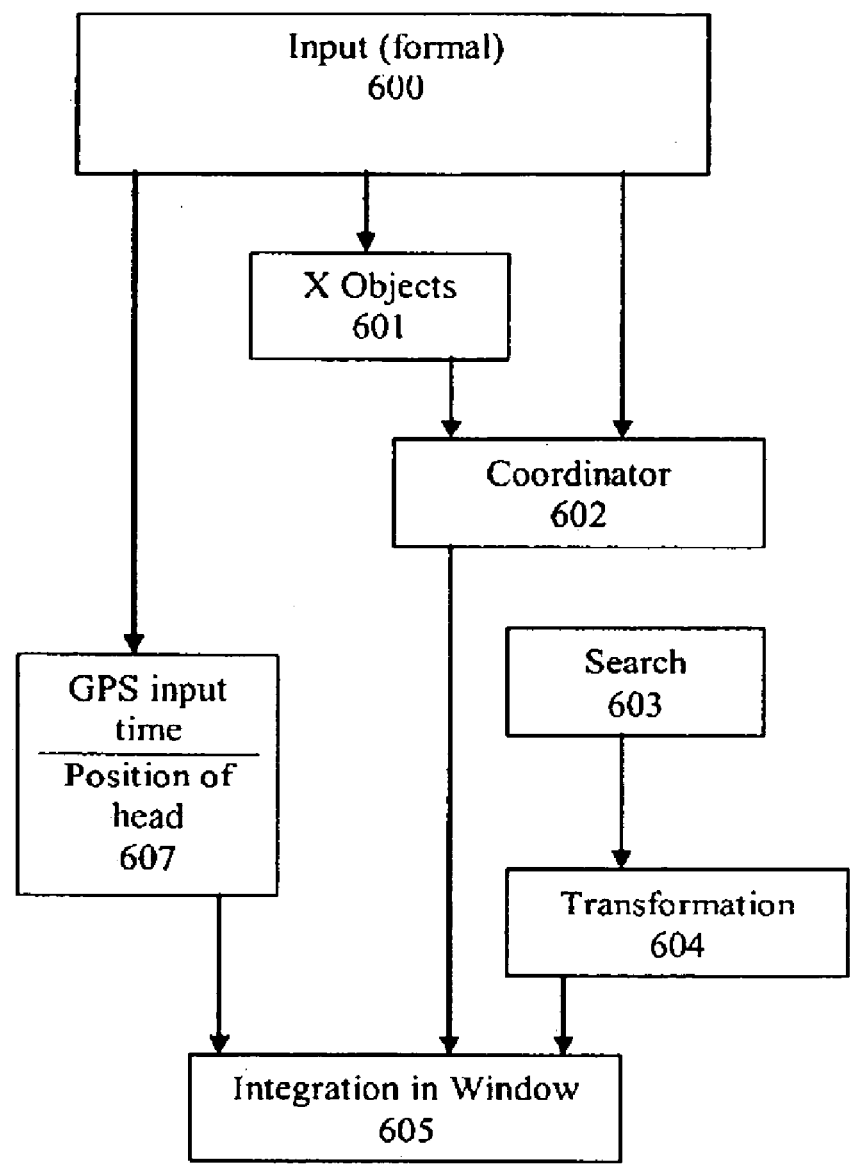
FIG. 6 describes the image reconstructor according to the present invention.

FIG. 6 describes the image reconstructor module 305. It uses the data output from the audio and image interpreters and combines the data to create an image.

A first input 600 entered in the image reconstructor module consists of the formal object possibility described in FIG. 5 (formal representation of possible events 507).

A second input that is entered is the sequence of formal existing and X objects 601. The coordinator module 602 coordinates the background with an image. The coordinator module coordinate pairs of events that are associated—like a dolphin and ocean (since a dolphin is in an ocean).

The third input is from the GPS comprising input time and the position of a viewer's head 607.

The search module 603 uses data from the inputs to find an object that best matches the scenario. In the present case, this is a dolphin. The regenerated image is then transformed 604 to obtain a virtual image that corresponds to the actual location of some real object. The object chosen from the databases is changed to accustom the scene or background. For example, the size of a dolphin which swims, needs to be adjusted. In a further step the image is integrated onto the window, or projected on the screen 605.

Method for Generating Virtual Images

Figure 7:
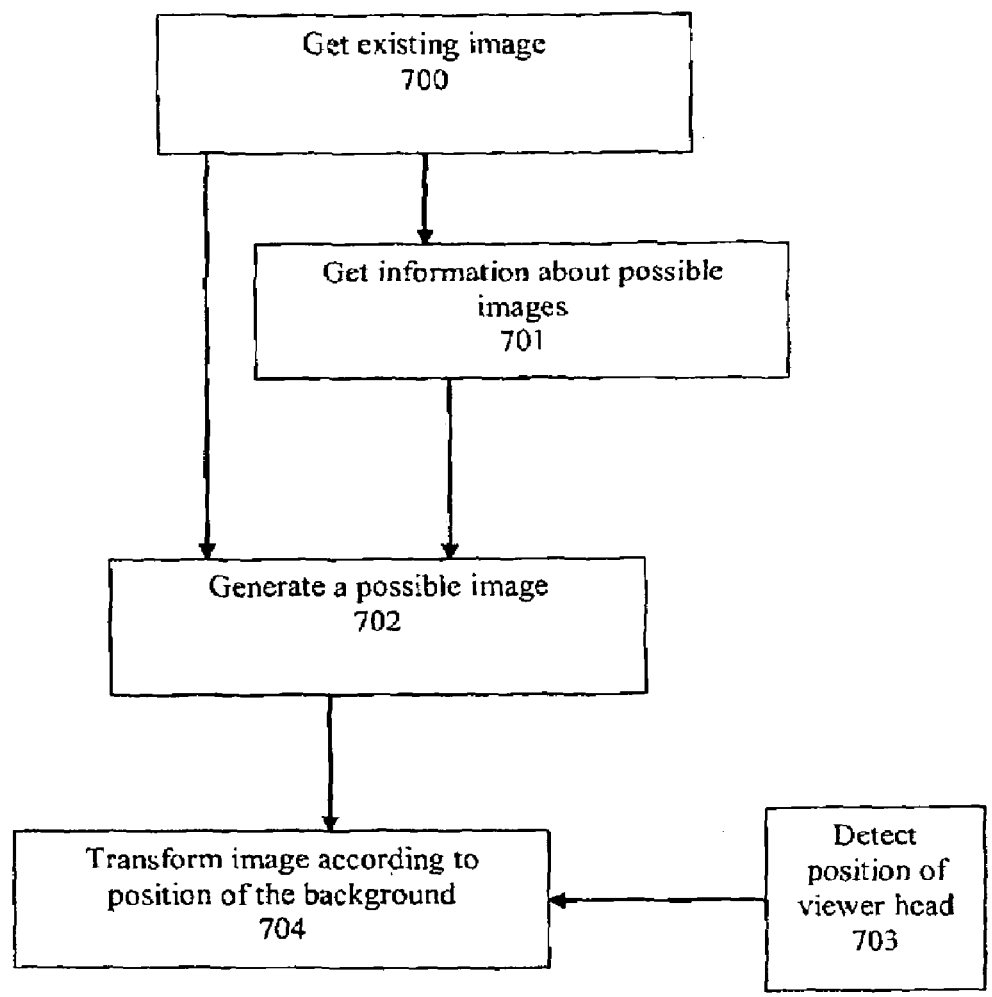
FIG. 7 is a flowchart of the method according to the present invention.

FIG. 7 is a flowchart of the method according to the present invention.

Step 700: getting an existing image. Existing images are captured in a surrounding environment (e.g. something that a user may watch from a window, e.g. the sea or a ship in the sea).

Step 701: retrieving information about a possible virtual image. This step consists in searching for information about possible virtual images that can be associated in a given environment with something that is already being observed (and that are not actually being observed). This information is retrieved from a database. For example, a retrieved information about possible virtual images associated with an observed image of a ship in a sea could be dolphins that are not currently being presented in sea, or birds, or small boats etc. This also includes a history about details of possible images that could been seen in this area.

Step 702: generating a possible virtual image. A virtual image corresponding to the information retrieved in step 701, is generated (e.g. an image of a dolphin is found in the database) or created from available components (e.g. a person—one component—sitting in a small boat—another component). Virtual images are generated using the history of what kind of images could be in this location (e.g. blue dolphins usually swim in this location and therefore a virtual image of a blue dolphin is generated rather than of a black dolphin).

Step 703: detecting the position of the viewer's head or heads. Positions of one or several viewers heads and eyes are detected using cameras or other position/movement detection sensors.

Step 704: transforming the virtual image according to the position of the background. In this step virtual images are transformed and integrated with real images. Information about real location of a viewer or viewers and angles of their views are used. As well as information about location of real viewed objects is used to present virtual images in a form that it appears naturally integrated simultaneously for people who watch these images from different angles at the same time.

While the invention has been particularly shown and described with reference to a preferred embodiment, it will be understood that various changes in form and detail may be made therein without departing from the spirit, and scope of the invention.

What is claimed is:

1. A method for generating virtual images in order to create an augmented reality for one or a plurality of viewers watching a real background at the same time, said method comprising the steps of:

capturing images of a real background comprising one or a plurality of real objects;
recognizing one or more of said real objects in said captured images;
identifying possible virtual objects related to recognized real objects and not present in said captured images;
automatically interpreting the captured images;
generating virtual images of virtual objects among identified possible virtual objects based on interpreted captured images;
positioning each virtual object relatively to the real objects;
adapting the virtual images depending on the position of said virtual objects;
determining a plurality of angles of view to watch the background;

adapting said virtual images for each angle of view, in order to superimpose said virtual images on the real background; and displaying said virtual images so that said virtual objects are seen differently depending on the angle of view relatively to the real background.

2. The method according to claim 1 wherein the step of capturing images, comprises the further step of determining and associating a geographical position with said captured images.

3. The method according to claim 1 wherein the step of generating virtual images of virtual objects among identified possible virtual objects based on interpreted captures images, comprises the step of retrieving pre-stored virtual images of virtual objects.

4. The method according to claim 1 wherein the step of determining a plurality of angles of view to watch the real background, comprises the further step of determining directions in which viewers are watching by detecting the direction of eyes or head of each viewer watching the real background.

5. The method according to claim 1 wherein the step of displaying said virtual images so that said virtual objects are seen differently depending on the angle of view relatively to the real background, comprises the step of displaying said virtual images so that said virtual objects are seen differently by each viewer depending on the direction in which said viewer is watching.

6. The method according to claim 5 wherein the step of displaying said virtual images so that said virtual objects are seen differently by each viewer depending on the direction in which said viewer is watching, comprises the further step of displaying said virtual images on a support so that the virtual objects are seen by each viewer superimposed on the real the background visible through said support whatever the angle of view.

7. The method according to claim 5 wherein the step of displaying said virtual images so that said virtual objects are seen differently by each viewer depending on the direction in which said viewer is watching, comprises the further step of displaying to each viewer said virtual images on a head mount display, wherein said virtual images are seen superimposed on the real background.

8. The method according to claim 5 wherein the step of displaying said virtual images so that said virtual objects are seen differently by each viewer depending on the direction in which said viewer is watching, comprises the further step of displaying on a support at the same time different virtual images of the same virtual objects, said support being such that:

different virtual images can be seen independently according to the angle of view of the viewer in order to produce a three dimensional view of the virtual objects, and virtual images are seen superimposed on the real background visible through said support so that virtual objects fit with the real background.

9. The method according to claim 1 wherein the step of generating virtual images of virtual objects among identified possible virtual objects based on interpreted captured images, comprises the further steps of:

receiving audio data;
automatically transcribing said audio data into text;
automatically interpreting said text; and
generating virtual images of virtual objects among identified possible virtual objects based on interpreted captured images and interpreted text.

10. The method according to claim 1 wherein the step of displaying said virtual images so that said virtual images are seen differently by each viewer depending on the direction to which said viewer is watching further comprises:

generating a text related to the real objects and/or virtual objects;
generating a speech corresponding to the generated text by means of a text-to-speech synthesizer;
synchronizing the generated virtual images and the speech; and
displaying virtual images with the speech.

11. The method according to claim 1 wherein the step of automatically interpreting the captured images comprises the step of automatically interpreting the captured images based on recognized real objects and/or a geographical position associated with said captured images.

12. A system for generating virtual images in order to create an augmented reality for one or a plurality of viewers watching a real background at the same time, comprising:

image capture apparatus for capturing images of a real background comprising one or a plurality of real objects;
object recognition apparatus for recognizing one or more of said real objects in said captured images;
a computer processing component for identifying possible virtual objects related to recognized real objects and not present in said captured images, for automatically interpreting the captured images and for generating virtual images of virtual objects among identified possible virtual objects based on interpreted captured images, for positioning each virtual object relatively to the real objects, for adapting the virtual images depending on the position of said virtual objects, for determining a plurality of angles of view to watch the background, and for adapting said virtual images for each angle of view, in order to superimpose said virtual images on the real background; and
a display component for displaying said virtual images so that said virtual objects are seen differently depending on the angle of view relatively to the real background.

13. A non-transitory computer readable medium storing a program comprising instructions for carrying out a method for generating virtual images in order to create an augmented reality for one or a plurality of viewers watching a real background at the same time, wherein said method comprising the steps of:

capturing images of a real background comprising one or a plurality of real objects;
recognizing one or more of said real objects in said captured images;
identifying possible virtual objects related to recognized real objects and not present in said captured images;
automatically interpreting the captured images;
generating virtual images of virtual objects among identified possible virtual objects based on interpreted captured images;
positioning each virtual object relatively to the real objects;
adapting the virtual images depending on the position of said virtual objects;
determining a plurality of angles of view to watch the background;
adapting said virtual images for each angle of view, in order to superimpose said virtual images on the real background; and
displaying said virtual images so that said virtual objects are seen differently depending on the angle of view relatively to the real background.

* * * * *